Figure 1:
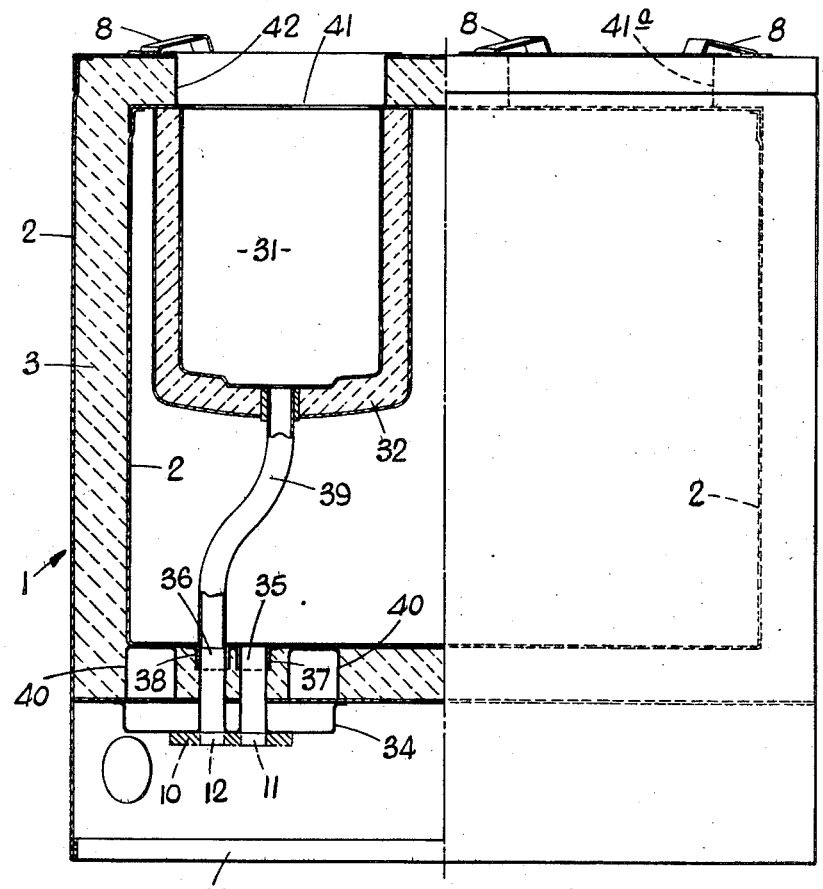

Jan. 5, 1954   E. HARRISON   2,665,034
PORTABLE APPARATUS FOR DISPENSING BEVERAGES
Filed Aug. 24, 1950   3 Sheets-Sheet 1

Inventor
EDWARD HARRISON.
By Worth Wade
Attorney.

Jan. 5, 1954            E. HARRISON            2,665,034

PORTABLE APPARATUS FOR DISPENSING BEVERAGES

Filed Aug. 24, 1950            3 Sheets-Sheet 2

Inventor
EDWARD HARRISON.
By Worth Wade
Attorney.

Inventor
EDWARD HARRISON.
By Worth Wade
Attorney.

Patented Jan. 5, 1954

2,665,034

UNITED STATES PATENT OFFICE 2,665,034

PORTABLE APPARATUS FOR DISPENSING BEVERAGES

Edward Harrison, Sheldon, Birmingham, England, assignor of one-half to William Henry Grady, Bourneville, Birmingham, England Application August 24, 1950, Serial No. 181,217

Claims priority, application Great Britain March 30, 1950

3 Claims. (Cl. 222—131)

The present invention relates to improvements in portable apparatus for dispensing beverages.

It is directed to portable apparatus for dispensing two liquids in predetermined quantities.

More particularly it concerns apparatus of the kind wherein containers for the liquids to be dispensed and a serving tray are suspended by a harness intended to be worn by the person dispensing the drinks.

Portable apparatus of this kind comprises separate containers for each liquid, the liquids being conducted through separate conduits to a valve chamber formed with two passages with which said conduits communicate. Within the valve chamber is a rotary valve member which in one position closes said passages and in another position has parts which register with said passages and conducts the liquid therefrom either to continuation passages on the other side of the valve which lead to a common outlet or alternatively directly to a common outlet.

It is desirable to provide means whereby one of the passages, either at the outlet side or the inlet side of the valve, has means for regulating the flow of liquid therethrough. Take for instance the dispensing of coffee and milk, or tea and milk, by the provision of the said regulating means the coffee (or tea) and milk can be served in different proportions or strengths.

It is to be understood that the invention is suited for delivering various combinations of liquids.

For the purpose of illustration, let it be assumed that the regulating means is included in a passage on the outlet side of the valve for milk this would give a regulated supply of milk which could be determined according to requirements so that coffee or tea, as the case may be, can be served in different strengths, or proportions.

Now an object of the present invention is to provide a regulable outlet so constructed and arranged that two liquids, for example, coffee and milk, are mixed together in desired proportions and delivered simultaneously, thus expediting the service.

For producing the flow of one liquid an induced flow of the other liquid has been proposed in apparatus of this kind. There are certain disadvantages in the use of an injector. It is liable to become clogged and when this happened it necessitated the removal of the delivery pipe on the outlet side of the valve in order to clear it. Again for different grades of milk a different size injector was required which again called for dismantling.

Another object is to provide simple and efficient means for regulating the rate of flow, of say milk, so that the proportion of milk to coffee may be varied, so that should clogging take place it can be cleared quickly and easily.

A further object is to provide simple and efficient means for regulating the rate of flow of a liquid that the rate can be altered expeditiously.

A still further object is so to arrange the regulating means that the rate of flow can be shut off completely when desired.

Another object is to provide valve control means adapted to discharge through a single outlet two liquids which are mixed in predetermined proportions.

Figure 2:
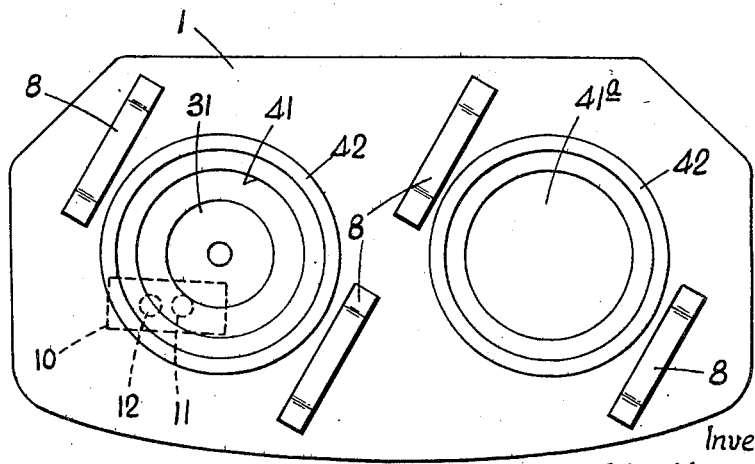
Figure 3:
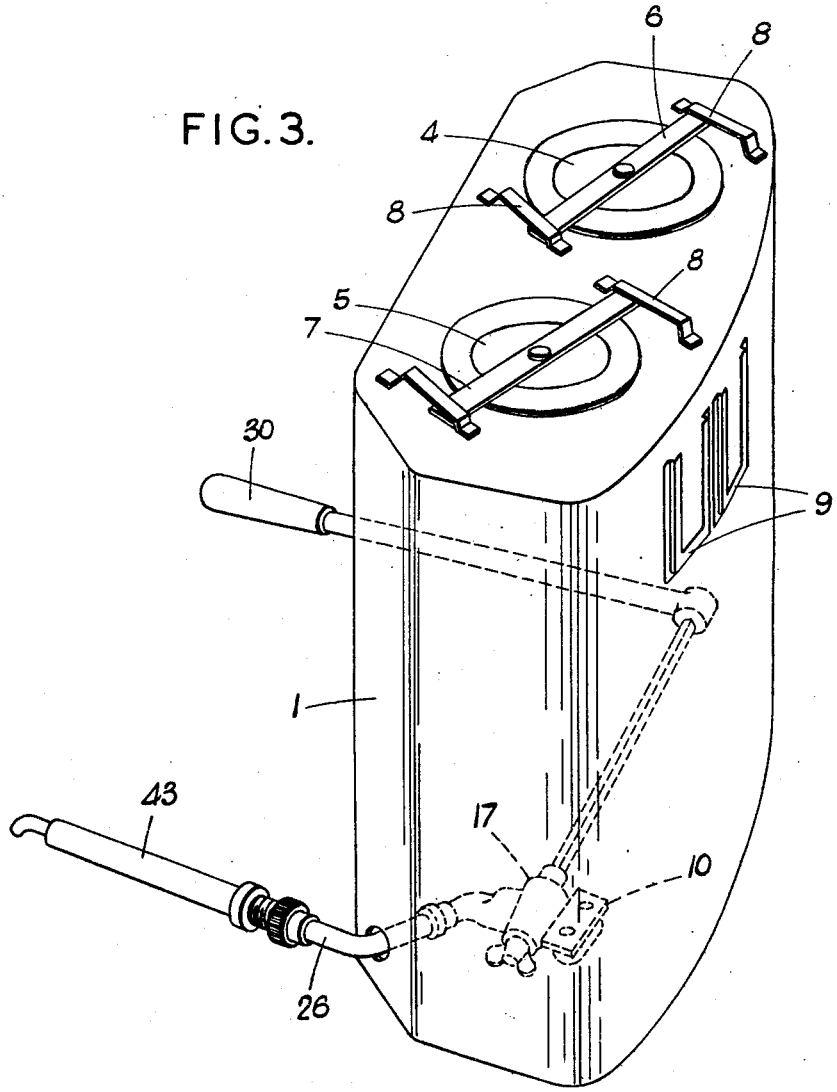
Figures 4, 6:
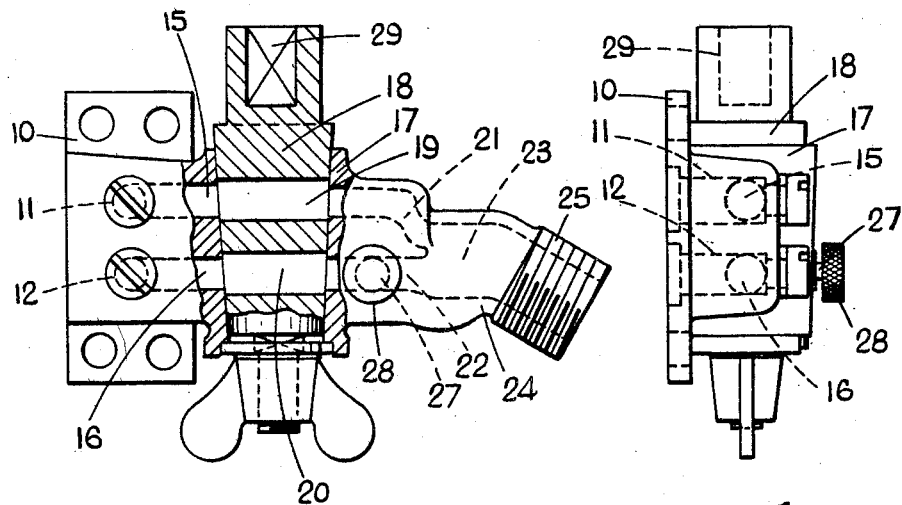
Figure 5:
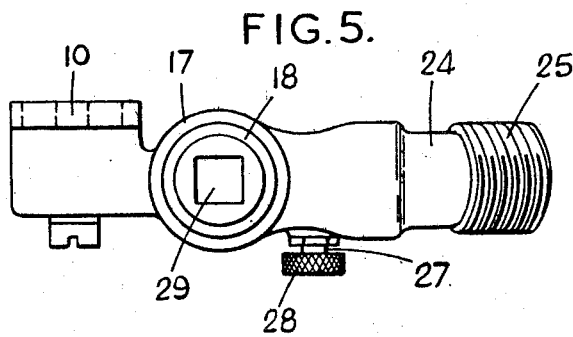
Figure 7:
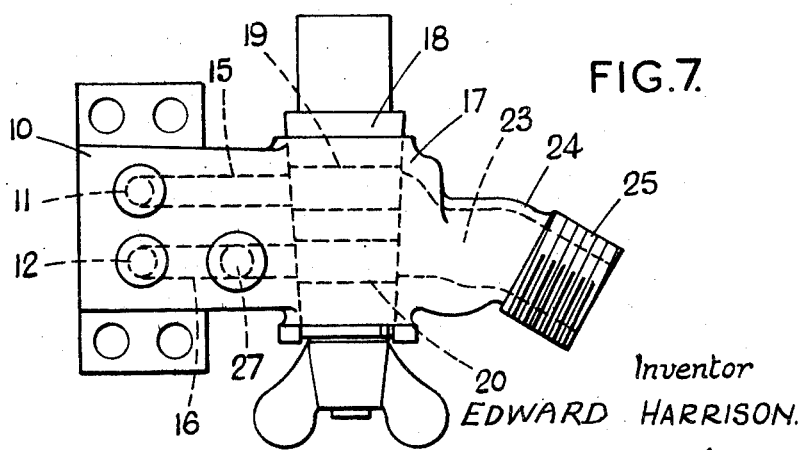

The accompanying drawings show a form of portable apparatus for dispensing beverages embodying the present invention:

Figure 1 is an elevation partly in section, Figure 2 a plan view and Figure 3 a perspective view of the portable apparatus. Figure 4 is a part sectional view of the fitting comprising the valve chamber, valve member and means for regulating the rate of flow of one of the liquids. Figure 5 is a plan view thereof and Figure 6 an end view. Figure 7 is a view showing a modified construction.

Similar numerals refer to similar parts throughout the several views.

Referring to Figures 1 and 2, a container 1 consisting of inner and outer walls 2 with suitable insulation 3 such as glass wool therebetween, serves as one liquid holder, say for coffee. Within this container or holder is housed a second container 31 for the other liquid, say milk. This second container has insulation 32 between inner and outer walls.

Closing caps 4 and 5 are provided for the openings 41 and 41ª of the containers. Spun necks 42 may be provided. These caps while ensuring that the liquids do not splash out are removable for filling and are held to position by any suitable means. The means shown consist of members 6 and 7 the ends of which engage under clips 8. Holders 9 for tickets, labels or other matter may be provided.

The outer wall 2 is continued downwardly to form an open bottomed chamber 33. The bottom of the container 1 has secured thereto a tap mounting support 34. Attached thereto is the bracket 10 of the fitting referred to later. The bottom has passages or tubes 35 and 36 through which the liquids flow to passages 11 and 12 in the bracket 10. 37 and 38 are ferrules. The container 31 has a pipe 39 leading to the passage or tube 36. Stiffeners 40 may be inserted in the bottom of the container 1. In Figure 1 the whole of the fitting is not shown but merely the bracket part.

It is to be understood that the portable apparatus may be carried by harness worn by the server, which is adapted to support the container at the front or the back of the server. When supported on the back the harness may also support a tray at the front of the server.

Now turning to Figures 4 to 6 inclusive. These views illustrate the fitting comprising a valve housing, a valve chamber, a valve or tap member and the regulating means. The fitting is located within the chamber 33 and comprises the bracket 10 attached to the mounting support 34. The bracket has passage-ways 11 and 12, communicating with the passages 35 and 36.

The bracket 10 is formed integral with the inlet side of the valve housing 17 and has two passages 15 and 16 in communication with the pipes 13 and 14. The housing 17 accommodates a rotary valve plug 18 having two passages 19 and 20 extending transversely therethrough. With the valve in the open position, the passage 19 communicates at one side with the passage 15, and the passage 20 with the passage 16. On the other side the passage 19 communicates with a passage 21 and the passage 20 with a passage 22. The passages 21 and 22 communicate with a common outlet conduit 23.

The end 24 of the valve housing remote from the bracket 10 has a thread 25 to receive an extension or delivery pipe 26. A tap may be fitted adjacent the outer end of the delivery pipe 26.

The rotary plug in a closed position acts to seal or shut off the passages 15 and 16 from the passages 21 and 22 so that no liquid can pass through the valve to the discharge side.

In order that the proportion of one liquid to the other liquid, for example, milk to coffee, can be varied to suit different requirements, the passage 22 at the outlet side is fitted with a valve 27, for example, a needle valve. The stem of the valve 27 extends to the outside of the valve housing and has a knurled head 28 which can be turned to move the needle end of the valve further into the passage 22 or to withdraw, or partly withdraw, said end therefrom so that the flow of the liquid passing from the passage 20 to the passage 22 is varied and a desired mixture obtained.

The upper end of the rotary plug 18 projects from the housing 17 and has a squared hole 29 for receiving the squared end of a remote control lever 30.

In practice, with a portable apparatus according to the present invention the operator or server holds the cup or receptacle in one hand and presents this to the end of a delivery pipe 43. The operator then manipulates a control lever 30 with the other hand to turn the plug 18.

Figure 7 shows a needle valve 27 fitted at the inlet side of the valve. In this case the passages 21 and 22 can be omitted and a common port communicating with both passages 19 and 20 provided, this common port delivering into the common outlet conduit 23.

The apparatus may be so designed that more than two liquids may be dispensed in predetermined proportions. Also regulating means may be provided for each liquid.

With apparatus according to the present invention the necessity of having to employ separate taps for different liquids is avoided and at the same time the proportions of the liquids can be varied.

In use the portable apparatus presents a smart appearance and is comfortable to carry. It is easily cleaned and hygenic.

There is only one moving part, viz., the valve plug operated by the remote control lever.

When hot drinks are being vended the liquid comes direct from the valve plug and this is located close to the insulated holders. After serving there is no column of liquid left in the delivery pipe to get cold.

The portable apparatus is so made as to stand up to the torsional stress set up by the remote control lever.

As many embodiments of the present invention may be made, and as the parts herein described may be varied in many ways, all without departing from the scope of the invention, it is to be understood that all matter herein set forth or shown in the accompanying drawings is to be interpreted as illustrative and not in a limiting sense.

I claim:

1. Portable apparatus for dispensing beverages comprising in combination, an insulated outer container for one liquid, an inner insulated liquid container for another liquid mounted within the outer container and being of lesser length than the outer container, each container having its own independent insulated walls, separate closure caps for each container, a lower open-bottomed chamber formed by the continuation downwardly of the wall of the outer container beyond the bottom thereof, a mounting support secured to said bottom, a valve fitting having two passage-ways, one for each liquid, one end of the fitting being attached to said mounting support, an outlet from the outer container leading to one of said passage-ways, an outlet from the inner container leading to the other passage-way, a common delivery pipe leading from the other end of said fitting and extending beyond the wall of the lower chamber, a plug cock having passageways within said fitting and interposed between the inlet and outlet ends thereof, the passage-ways communicating with the passage-ways in said fitting, a hand actuated control lever for turning the plug cock extending into the lower chamber, and an independent valve mounted in said fitting for regulating the flow of one liquid to the common delivery pipe.

2. Portable apparatus according to claim 1, wherein the independent valve is mounted on the inlet side of the plug cock.

3. Portable apparatus according to claim 1, wherein the independent valve is mounted on the outlet side of the plug cock.

EDWARD HARRISON.

References Cited in the file of this patent

UNITED STATES PATENTS

| Number | Name | Date |
| --- | --- | --- |
| 283,060 | Bailey et al. | Aug. 14, 1883 |
| 1,489,840 | Lyons | Apr. 8, 1924 |
| 1,673,007 | Kaiser | June 12, 1928 |
| 2,408,664 | Lloyd | Oct. 1, 1946 |
| 2,433,977 | Bently | Jan. 6, 1948 |
| 2,559,877 | Ihle et al. | July 10, 1951 |